US010320075B2

(12) United States Patent
Sanchez

(10) Patent No.: US 10,320,075 B2
(45) Date of Patent: Jun. 11, 2019

(54) MONOLITHIC PHASED-ARRAY ANTENNA SYSTEM

(71) Applicant: Victor C. Sanchez, Ellicott City, MD (US)

(72) Inventor: Victor C. Sanchez, Ellicott City, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 436 days.

(21) Appl. No.: 14/837,954

(22) Filed: Aug. 27, 2015

(65) Prior Publication Data

US 2017/0062925 A1    Mar. 2, 2017

(51) Int. Cl.
| | |
|---|---|
| *H01Q 21/08* | (2006.01) |
| *H01Q 3/26* | (2006.01) |
| *H01Q 21/06* | (2006.01) |
| *H01Q 21/29* | (2006.01) |
| *H01Q 1/50* | (2006.01) |

(Continued)

(52) U.S. Cl.
CPC ............... *H01Q 3/26* (2013.01); *H01Q 1/50* (2013.01); *H01Q 13/085* (2013.01); *H01Q 21/0087* (2013.01); *H01Q 21/0093* (2013.01); *H01Q 21/064* (2013.01); *H01Q 21/067* (2013.01); *H01Q 21/24* (2013.01); *H01Q 21/293* (2013.01); *B33Y 10/00* (2014.12); *B33Y 50/02* (2014.12); *B33Y 80/00* (2014.12)

(58) Field of Classification Search
None
See application file for complete search history.

(56) References Cited

U.S. PATENT DOCUMENTS

| 5,155,050 A | 10/1992 | Bayraktaroglu |
| 5,483,246 A | 1/1996 | Barnett et al. |

(Continued)

FOREIGN PATENT DOCUMENTS

| JP | 2001-36306 | 2/2001 |
| WO | WO 2014/117259 A1 | 8/2014 |

OTHER PUBLICATIONS

Church: "Additive Manufacturing: The Next Frontier for Research, Business and Opportunity", NSF Workshop on Frontiers of Additive Manufacturing Research and Education, Jul. 12, 2013 (Jul. 12, 2013), pp. 1-27, XP055315495, Arlington, VA, USA Retrieved from the Internet: URL:http://nsfam.mae.ufl.edu/Slides/Church_.pdf [retrieved on Nov. 1, 2016] p. 16-p. 16 p. 20-p. 20 p. 26-p. 26.

(Continued)

*Primary Examiner* — Trinh V Dinh
(74) *Attorney, Agent, or Firm* — Tarolli, Sundheim, Covell & Tummino LLP

(57) ABSTRACT

One embodiment describes a phased-array antenna system that is formed as a monolithic structure of a unitary conductive material. The system includes a ground plane and a plurality of antenna transformer elements formed in an array and conductively coupled to a first surface of the ground plane. The system also includes a plurality of connectors formed and conductively coupled to a second surface of the ground plane opposite the first surface, the plurality of connectors being configured to propagate radio frequency signals to or from respective ones of the plurality of antenna transformer elements.

12 Claims, 3 Drawing Sheets

(51) Int. Cl.
*H01Q 21/00* (2006.01)
*H01Q 13/08* (2006.01)
*H01Q 21/24* (2006.01)
*B33Y 10/00* (2015.01)
*B33Y 50/02* (2015.01)
*B33Y 80/00* (2015.01)

(56) References Cited

U.S. PATENT DOCUMENTS

| | | | |
|---|---|---|---|
| 6,147,647 A | 11/2000 | Tassoudji et al. | |
| 6,356,240 B1 * | 3/2002 | Taylor | H01Q 21/24 343/767 |
| 6,366,184 B1 | 4/2002 | Ohtonen | |
| 6,501,426 B2 | 12/2002 | Waterman | |
| 6,552,691 B2 * | 4/2003 | Mohuchy | H01Q 13/085 343/770 |
| 6,737,936 B2 | 5/2004 | Noguchi | |
| 6,831,601 B1 | 12/2004 | Lopez et al. | |
| 6,967,624 B1 | 11/2005 | Hsu et al. | |
| 6,999,034 B1 | 2/2006 | Tsai et al. | |
| 7,180,457 B2 * | 2/2007 | Trott | H01Q 21/064 343/770 |
| 7,907,090 B2 | 3/2011 | Bershadsky et al. | |
| 8,144,059 B2 | 3/2012 | Lynch | |
| 8,736,505 B2 * | 5/2014 | Lambert | H01Q 13/085 343/767 |
| 2001/0054978 A1 | 12/2001 | Adachi et al. | |
| 2004/0004580 A1 | 1/2004 | Toland et al. | |
| 2004/0164915 A1 * | 8/2004 | Quan | H01Q 3/22 343/754 |
| 2006/0038732 A1 | 2/2006 | Deluca et al. | |
| 2007/0296639 A1 * | 12/2007 | Hook | H01Q 13/0241 343/767 |
| 2013/0214980 A1 * | 8/2013 | Lambert | H01Q 13/085 343/771 |
| 2013/0328635 A1 | 12/2013 | Sekiguchi | |
| 2014/0231266 A1 | 8/2014 | Sherrer et al. | |
| 2014/0285394 A1 | 9/2014 | Truthan | |

OTHER PUBLICATIONS

Ghazali, et al: "Affordable 3D printed microwave antennas", 2015 IEEE 65th Electronic Components and Technology Conference (ECTC), May 26, 2015 (May 26, 2015), pp. 240-246, XP055310432, 001: 10.1109/ECTC.2015.7159599 section IV. b.; p. 244-p. 245; figures 16-20.

Guan-Long, et al: "3-D metal-direct-printed wideband and high-efficiency waveguide-fed antenna array", The Institute of Electrical and Electronics Engineers, Inc. (IEEE) Conference Proceedings, May 1, 2015 (May 1, 2015), p. 1, XP055310499, Piscataway sections I.-III.; p. 1-p. 2; figures 1, 2.

International Search Report for PCT/US2016/046588, dated Nov. 11, 2016.

Topalli, et al.: "*A Monolithic Phased Array Using 3-Bit Distributed RF MEMS Phase Shifters*"; *Microwave Theory and Techniques, IEEE Transactions on* 56.2 (2008): 270-277.

* cited by examiner

MONOLITHIC PHASED-ARRAY ANTENNA SYSTEM

TECHNICAL FIELD

The present invention relates generally to communications, and specifically to a monolithic phased-array antenna system.

BACKGROUND

Antennas are implemented for a variety of purposes to convert energy from electrical signals to waves propagating in free-space, and thus to transmit and receive wireless signals. Antennas can be manufactured in a variety of ways, and for a variety of applications. One type of antenna is a phased-array antenna. A phased-array antenna includes an array of antennas in which the relative phases of respective signals feeding the antennas are set in such a way that an effective radiation pattern of the array is reinforced in a desired direction and suppressed in undesired directions. Similarly, the array arrangement of the antennas can be such to determine a direction of a received signal based on an order in which the received signal is received at each respective one of the antennas. The phase relationships among the antennas in a phased-array antenna may be fixed, such as in a tower array, or may be adjustable, as for beam steering. Thus, phased-array antennas can be useful for a variety of wireless communications applications.

SUMMARY

One embodiment describes a phased-array antenna system. The system includes a ground plane that is formed from a unitary conductive material. The system also includes a plurality of antenna transformer elements that are each formed from the unitary conductive material in an array on a first surface of the ground plane, and being configured to wirelessly transmit or receive a signal. The system further includes a plurality of connectors that are each formed from the unitary conductive material on a second surface of the ground plane opposite the first surface. The connectors can be configured to propagate respective portions of the signal to or from the antenna transformer elements. The unitary conductive material can be contiguous such that the phased-array antenna system is formed as a monolithic structure to provide conductive coupling of the ground plane, the antenna transformer elements, and the connectors with respect to each other.

Another embodiment describes a method for forming a phased-array antenna system. The method includes loading dimensional data regarding the phased-array antenna system into an additive manufacturing machine configured to form the phased-array antenna system. The method also includes forming the phased-array antenna system as a monolithic structure of a unitary conductive material via the additive manufacturing machine. The phased-array antenna system can include a ground plane, an array of antenna transformer elements disposed on a first surface of the ground plane, and a plurality of connectors formed on a second surface of the ground plane opposite the first surface. The plurality of connectors can be configured to propagate respective portions of the signal to or from respective antenna transformer elements of the array of antenna transformer elements.

Another embodiment describes a phased-array antenna system. The system includes a ground plane and a plurality of antenna transformer elements formed in an array and conductively coupled to a first surface of the ground plane. Each of the plurality of antenna transformer elements can be dimensioned to form a balun cavity between respective pairs of the plurality of antenna transformer elements with respect to the ground plane and to form a transformer gap between respective pairs of the plurality of antenna transformer elements to provide impedance matching to free-space. The system includes a plurality of connectors formed and conductively coupled to a second surface of the ground plane opposite the first surface, the plurality of connectors being configured to propagate radio frequency signals to or from respective ones of the plurality of antenna transformer elements. The system also includes a plurality of coaxial connections between the plurality of connectors and the plurality of transformer elements. Each of the plurality of connectors can be associated with one of the plurality of antenna transformer elements and comprising a signal conductor that is formed from the unitary conductive material as an inner conductor of a respective one of the plurality of coaxial connections and extending through an associated one of the plurality of antenna transformer elements that corresponds to an outer conductor of the respective one of the plurality of coaxial connections to an adjacent one of the plurality of antenna transformer elements. The phased-array antenna system is formed as a monolithic structure of a unitary conductive material.

DETAILED DESCRIPTION

The present invention relates generally to communications, and specifically to a monolithic phased-array antenna system. The monolithic phased-array antenna system can be formed as a single structure that can be either metal or a dielectric that is later metalized. The monolithic phased-array antenna system can be applicable for broadband operation in a multitude of wireless communications and radar applications. The monolithic phased-array antenna system can be composed of an array of transformer elements that are all monolithically fabricated, such as by additive manufacturing (e.g., three-dimensional printing) of antenna transformer elements on a ground plane that forms balun cavities with respect to the transformer elements. The phased-array antenna system can also include connectors that are formed on the ground plane beneath the antenna transformer elements, and can each include signal conductors to propagate a communications signal. The phased-array antenna system can be formed from a unitary conductive material, and thus can be completely contiguously conductively coupled (e.g., to a DC ground). As a result, the phased-array antenna system can omit the use of a printed circuit board (PCB) that incorporates a stripline and balun member to convert and excite the respective signal from a given connector to the antenna radiating elements.

Each of the antenna transformer elements can be fabricated with specific dimensions to facilitate specific wave parameters for generating a given signal for communication and/or radar applications. Additionally, each of the connectors that is associated with one of the antenna transformer elements is conductively coupled to at least one adjacent antenna transformer element in a coaxial manner. A signal conductor can be coupled to a respective one of the connectors and can extend from beneath an associated one of the antenna transformer elements as an inner conductor of a coaxial connection, through a side portion of the associated one of the antenna transformer elements that forms the outer conductor of the coaxial connection, to an adjacent one of the antenna transformer elements to make a conductive coupling to the exterior of the adjacent antenna transformer element. The coaxial arrangement of the connections of each of the connectors through an associated antenna transformer element to a respective adjacent antenna transformer element can be provided in both of two orthogonal directions, such that the orthogonal directions form polarization components of the signal that propagates via the antenna transformer elements.

Figure 1:
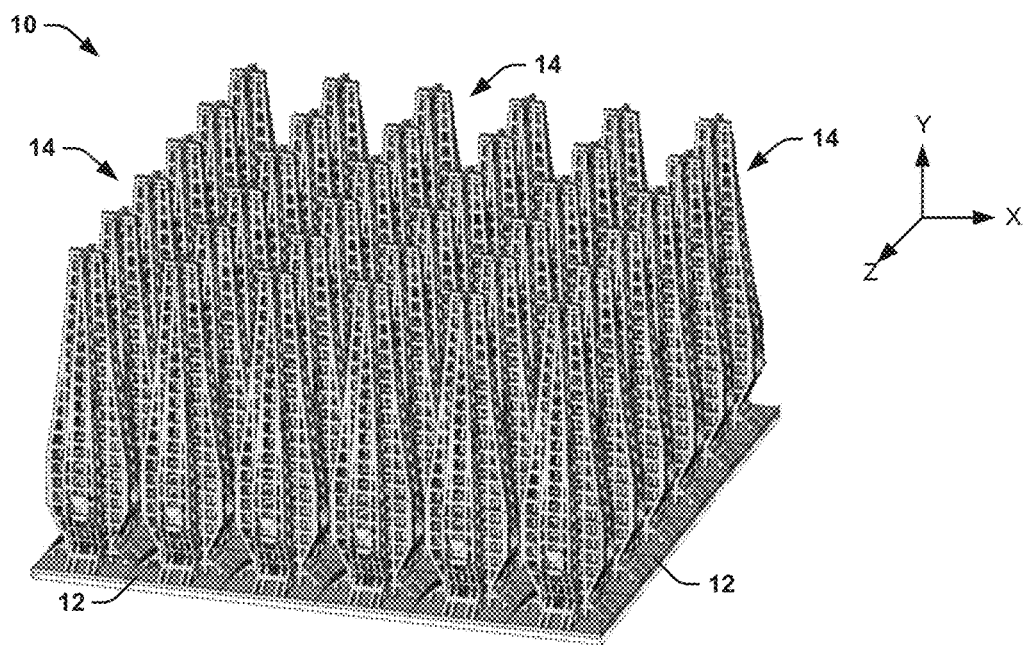
FIG. 1 illustrates an example of a phased-array antenna system.

FIG. 1 illustrates an example of a phased-array antenna system 10. The phased-array antenna system 10 can be implemented in a variety of wireless communication and/or radar applications. The phased-array antenna system 10 includes a ground plane 12 on which a plurality of antenna transformer elements 14 are formed in an array, demonstrated in an XZ-array in the example of FIG. 1. The antenna transformer elements 14 are formed on a first side of the ground plane 12, and can be associated with a plurality of connectors (not shown) that are formed on a second side of the ground plane 12 opposite the first side. The connectors can be configured to propagate an electric signal that can be associated with a wireless signal that is transmitted from or received at the phased-array antenna system 10. As described in greater detail herein, the connectors can be coupled to the antenna transformer elements 14 in a coaxial connection to provide excitation of the antenna transformer elements 14 to receive or transmit signals from or to the phased-array antenna system 10.

As an example, the phased-array antenna system 10 can be fabricated as a monolithic structure. For example, the phased-array antenna system 10 can be formed from an additive manufacturing process (e.g., three-dimensional printing), such that the ground plane 12, the antenna transformer elements 14, and the connectors can all be formed from a unitary conductive material. For example, the ground plane 12, the antenna transformer elements 14, and the connectors can be formed from the unitary conductive material via the additive manufacturing process. As another example, the ground plane 12, the antenna transformer elements 14, and the connectors can be formed from a dielectric material via the additive manufacturing process, and can be metalized to coat the ground plane 12, the antenna transformer elements 14, and the connectors, and thus the entire phased-array antenna system 10, in the unitary conductive material. As an alternative example, the monolithic arrangement of the phased-array antenna system 10 can be fabricated from other processes, such as compression molding, injection molding, or formed in any other desired manner, such as by using bulk molding or sheet molding compounds or thermoplastic prepreg composite components and structures.

As a result, the monolithic arrangement of the phased-array antenna system 10 can be such that the ground plane 12, the antenna transformer elements 14, and the connectors can all be conductively coupled with respect to each other. As is described in greater detail herein, the monolithic arrangement of the ground plane 12 with respect to the antenna transformer elements 14 can be such that the antenna transformer elements 14 can form baluns with respect to the ground plane 12. Accordingly, the phased-array antenna system 10 can omit the use of a printed circuit board (PCB) that incorporates a stripline and balun member to convert and excite the respective signal from a given connector to the antenna radiating elements 14, as opposed to typical phased-array antenna systems.

Figure 2:
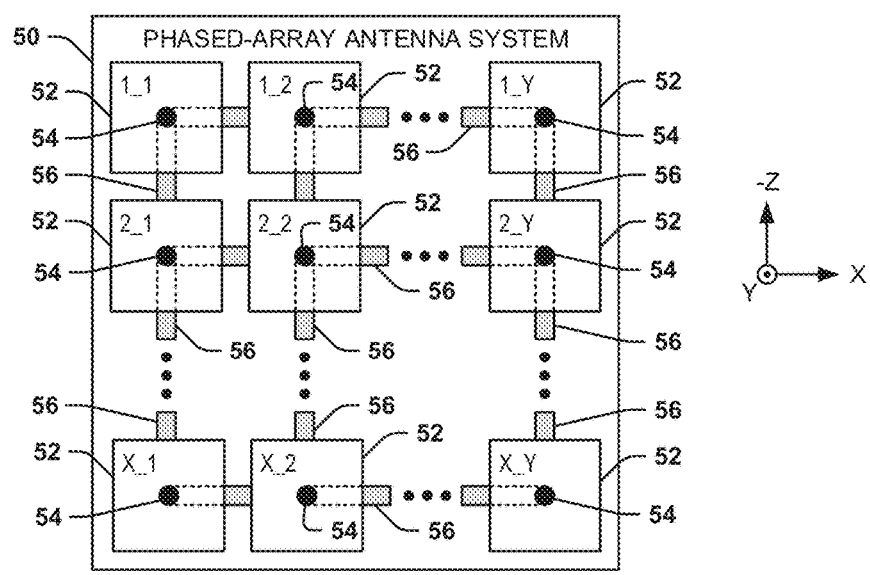
FIG. 2 illustrates an example diagram of a phased-array antenna system.

FIG. 2 illustrates an example diagram of a phased-array antenna system 50. As an example, the phased-array antenna system 50 can correspond to the phased-array antenna system 10 in the example of FIG. 1. The phased-array antenna system 50 demonstrates a plurality of antenna transformer elements 52 arranged in an XZ-array. In the example of FIG. 2, the phased-array antenna system 50 includes X rows and Y columns of antenna transformer elements 52, with each of the antenna transformer elements 52 being designated by a "row_column" naming convention. While the phased-array antenna system 10 in the example of FIG. 1 demonstrates a 6×6 array of thirty-six antenna transformer elements 14, the phased-array antenna system 50 can include any X×Y arrangement of antenna transformer elements 52, where X and Y are each positive integers that may or may not be equal.

The phased-array antenna system 50 includes at least one connector 54 that is associated with each of the antenna transformer elements 52 and which is configured to propagate a signal that is either received or transmitted by the phased-array antenna system 50. For example, the connectors 54 can be conductively coupled to a signal transmitter that is configured to provide electric signals modulated at RF frequencies to be transmitted from the phased-array antenna system 50, or to a signal receiver that is configured to demodulate received electrical signals via the phased-array antenna system 50. The connectors 54 can each include signal conductors 56 on which the signal propagates that passes through the ground plane (e.g., the ground plane 12) on which the antenna transformer elements 52 are formed and through the associated one of the antenna transformer elements 52. The signal conductors 56 also extend from the associated one of the antenna transformer elements 52 in each of the X- and Z-directions to couple to an adjacent one of the antenna transformer elements 52 to provide a conductive coupling to the adjacent one of the antenna transformer elements 52.

With respect to the at least one connector 54 associated with each of the antenna transformer elements 52, it is to be understood that the phased-array antenna system 50 can include a single connector or separate connectors 54 for each of the signal conductors 56 extending from the respective antenna transformer elements 52. As an example, each of the antenna transformer elements 52 can include a first connector 54 that is associated with the signal conductor 56 that extends in the X-direction, and a separate connector 54 that is associated with the signal conductor 56 that extends in the Z-direction. As described in greater detail herein, the signal conductors 56 can propagate a signal that is to be transmitted or is received via resonation of the adjacent antenna transformer elements 52 between the respective signal conductors 56. The signal conductors 56 that extend in the X-direction can provide excitation of a wirelessly transmitted signal that is polarized in the X-direction, or can receive an X-direction polarization component of a received wireless signal. Similarly, the signal conductors 56 that extend in the Z-direction can provide excitation of a wirelessly transmitted signal that is polarized in the Z-direction, or can receive a Z-direction polarization component of a received wireless signal.

As described herein, an "associated antenna transformer element" or "associated one of the antenna transformer elements" refers to one of the antenna transformer elements 52 that is disposed over (e.g., in the Y-direction) a respective connector 54, and through which the signal conductor 56 extends without a direct conductive coupling, despite the indirect conductive coupling based on the monolithic arrangement of the phased-array antenna system 50 via the unitary conductive material. Thus, the "adjacent antenna transformer element" or "adjacent one of the antenna transformer elements" refers to one of the antenna transformer elements 52 that is adjacent to the associated antenna transformer element 52. As described in greater detail herein, the associated one of the antenna transformer elements 52 can correspond to an outer conductor of a coaxial connection between a respective connector 54 and an adjacent one of the antenna transformer elements 52, with the signal conductor 56 corresponding to the inner conductor of the coaxial connection. As also described in greater detail herein, the extension of the signal conductor 56 between a respective pair of antenna transformer elements 52 can provide excitation of the pair of antenna transformer elements 52 with respect to a transformer gap associated with the pair of antenna transformer elements 52 to provide impedance matching between the signal conductor 56 and free-space.

Figure 3:
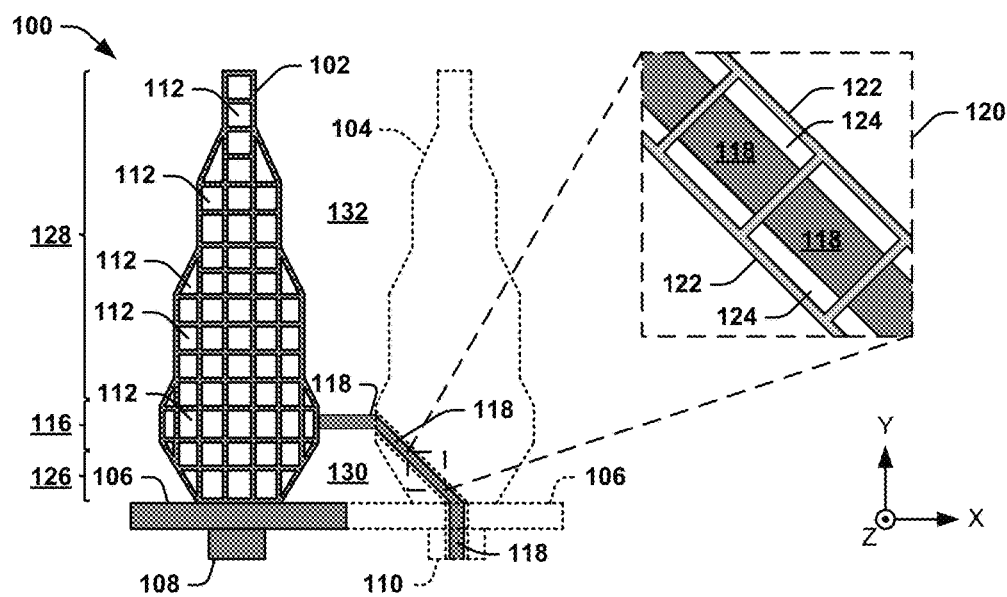
FIG. 3 illustrates an example diagram of a portion of a phased-array antenna system.

FIG. 3 illustrates an example diagram 100 of a portion of a phased-array antenna system. The phased-array antenna system of which the diagram 100 demonstrates a portion can correspond to the phased-array antenna systems 10 and 50 in the respective examples of FIGS. 1 and 2. The diagram 100 demonstrates a first antenna transformer element 102 and a second antenna transformer element 104, demonstrated in the example of FIG. 3 as merely a dashed outline. The diagram 100 also demonstrates a portion of a ground plane 106 that can extend in both the X-direction and the Z-direction, and which is demonstrated as a dashed outline beneath the second antenna transformer element 104. The diagram 100 also includes a first connector 108 that is associated with the first antenna transformer element 102 and a second connector 110 that is associated with the second antenna transformer element 104. Therefore, the first antenna transformer element 102 is an associated antenna transformer element and the second antenna transformer element 104 is an adjacent antenna transformer element with respect to the first connector 108, and the first antenna transformer element 102 is an adjacent antenna transformer element and the second antenna transformer element 104 is an associated antenna transformer element with respect to the second connector 110.

The first antenna transformer element 102 is demonstrated as having a plurality of sidewalls that extend in various directions away from the ground plane 106, with each of the sidewalls including a pattern of holes 112 that extend through the sidewalls of the first antenna transformer element 102. As an example, the holes 112 can be perforations that extend through the entirety of the sidewalls of the first antenna transformer element 102, such that the first antenna transformer element 102 is arranged as a cage-like structure that is composed of mesh walls. As described previously, the associated phased-array antenna system of which the diagram 100 demonstrates a portion can have been formed via an additive manufacturing process. As an example, the additive manufacturing process can be configured to form the associated phased-array antenna system from a dielectric material that is metalized to form the unitary conductive material. Therefore, the holes 112 can facilitate the metallization of the associated phased-array antenna system by providing access to the interior of the first antenna transformer element 102 to form the unitary conductive material over substantially all surfaces of the dielectric material that formed the shape of the first antenna transformer element 102 via the metallization process. Additionally, by forming the holes 112 through the sidewalls of the first antenna transformer element 102, less of the unitary conductive material is implemented to form the associated phased-array antenna system, resulting in a reduced weight of the associated phased-array antenna system. While the diagram 100 demonstrates that the first antenna transformer element 102 is formed to include the holes 112, it is to be understood that all of the antenna transformer elements of the associated phased-array antenna system can be formed to be substantially the same, and can thus all include the holes 112, similar to as demonstrated in the phased-array antenna system 10 in the example of FIG. 1.

In the example of FIG. 3, the antenna transformer elements 102 and 104 each include a feed section 116 that is associated with an interconnection of a coaxial connection between the antenna transformer elements 102 and 104. In the example of FIG. 3, the coaxial connection is demonstrated between the second connector 110 and the first antenna transformer element 102. The coaxial connection includes a signal conductor 118 that extends through the second connector 110, through the ground plane 106, and through the second antenna transformer element 104 to emerge through a sidewall of the second antenna transformer element 104 and extend to provide a conductive coupling to a sidewall of the first antenna transformer element 102. The signal conductor 118 thus is not directly conductively coupled to any portion of the phased-array antenna system except the first antenna transformer element 102. Instead, the signal conductor 118 corresponds to an inner conductor of the coaxial connection, and the second antenna transformer element 104, as well as the second connector 110 and the ground plane 106, corresponds to the outer conductor of the coaxial connection.

The diagram 100 demonstrates an exploded view 120 of the coaxial connection through the second antenna transformer element 104. The second antenna transformer element 104 can include a conductive portion 122 that substantially surrounds the signal conductor 118 as it passes through the second antenna transformer element 104, with the conductive portion 122 being conductively coupled to the ground plane 106 and to the sidewalls of the second antenna transformer element 104. In the example of FIG. 3, the conductive portion 122 is likewise demonstrated as having holes 124 along the length of the conductive portion 122 to facilitate metallization, as described previously. Therefore, the conductive portion 122, and thus the second antenna transformer element 104, provide the outer conductor of the coaxial connection between the second connector 110 and the first antenna transformer element 102. As described in greater detail herein, the signal conductor 118 extending between the first and second antenna transformer elements 102 and 104 can excite a slot-line-like transmission line mode between the first and second antenna transformer elements 102 and 104.

The antenna transformer elements 102 and 104 are also dimensioned to include a balun section 126 and a slot-line impedance transformer section 128. As an example, the dimensional shape and arrangement of the antenna transformer elements 102 and 104 with respect to the balun section 126 is such that the antenna transformer elements 102 and 104 cooperate to form a balun cavity 130 between the antenna transformer elements 102 and 104 with respect to the ground plane 106. Thus, the balun cavity 130 can provide a transition of signal energy between the coaxial connection (e.g., between the second connector 110 and the antenna transformer element 104) and a slot-line propagation of the respective signal energy with respect to the signal conductor 118. Additionally, the dimensional shape and arrangement of the antenna transformer elements 102 and 104 with respect to the slot-line impedance transformer section 128 is such that the antenna transformer elements 102 and 104 cooperate to form a transformer gap 132 between the antenna transformer elements 102 and 104. The transformer gap 132 is configured to provide impedance matching of the slot-line impedance of the signal conductor 118 (e.g., approximately 90Ω) to the impedance of free-space (e.g., approximately 377Ω). Therefore, the transformer gap 132 can act as a feedhorn for the phased-array antenna system, such that the signal energy of a transmitted signal that is provided on the signal conductor 118 can be resonated with respect to the first and second antenna transformer elements 102 and 104 to be wirelessly transmitted from the phased-array antenna system. Similarly, the first and second antenna transformer elements 102 and 104 can resonate with respect to received wireless signal energy to provide the signal energy on the signal conductor 118 and propagate the received signal (e.g., to a demodulator).

Figure 4:
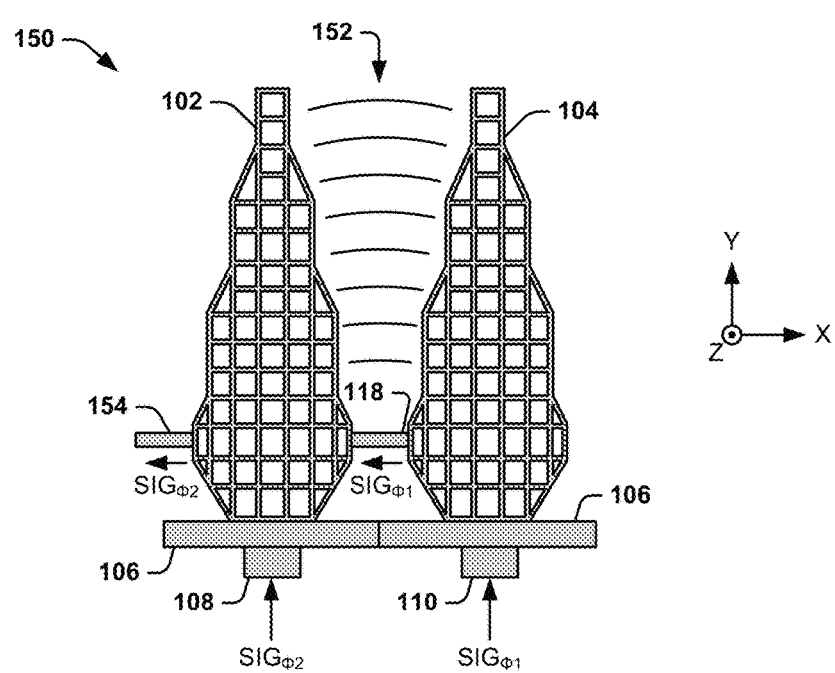
FIG. 4 illustrates another example diagram of a portion of a phased-array antenna system.

FIG. 4 illustrates another example diagram 150 of the portion of the phased-array antenna system. The diagram 150 demonstrates the first antenna transformer element 102 and the second antenna transformer element 104, as well as the portion of the ground plane 106, the first connector 108, and the second connector 110. In the example of FIG. 4, a signal $SIG_{\Phi 1}$ is provided to the second connector 110. The signal $SIG_{\Phi 1}$ can be a modulated signal having a given phase for transmission from the respective phased-array antenna system. The signal $SIG_{\Phi 1}$ thus propagates in the signal conductor 118, and thus via the coaxial connection between the second connector 110 and the first antenna transformer element 102. Therefore, the balun cavity 130 between the first and second antenna transformer elements 102 and 104 provides the transition of the signal energy between the coaxial connection and the slot-line propagation of the signal $SIG_{\Phi 1}$ on the portion of the signal conductor 118 that extends between the first and second antenna transformer elements 102 and 104. Additionally, the transformer gap 132 provides impedance matching of the slot-line impedance of the signal $SIG_{\Phi 1}$ propagating on the portion of the signal conductor 118 to the impedance of free-space, such that the signal energy of the signal $SIG_{\Phi 1}$ is resonated with respect to the first and second antenna transformer elements 102 and 104 to be wirelessly transmitted from the phased-array antenna system, demonstrated as the wireless signal 152.

The diagram 150 also demonstrates a signal $SIG_{\Phi 2}$ that is provided to the first connector 108. As an example, the signal $SIG_{\Phi 2}$ can be a modulated signal having a given phase for transmission from the respective phased-array antenna system, with the given phase possibly being different from the phase of the signal $SIG_{\Phi 1}$. Therefore, the signal $SIG_{\Phi 2}$ propagates in a signal conductor 154 associated with the first antenna transformer element 102 to be transmitted from a transformer gap between the first antenna transformer element 102 and another antenna transformer element (not shown) adjacent to the first antenna transformer element 102 in a similar manner.

While the diagrams 100 and 150 demonstrate the respective signal conductors 118 and 154 as extending along the X-direction, it is to be understood that the first and second antenna transformer elements 102 and 104 are but two antenna transformer elements in an array. Thus, the respective phased-array antenna system can include additional antenna transformer elements arranged in an XZ-array on the surface of the ground plane 106, with respective connectors associated with each of the antenna transformer elements in the array. As an example, each of the first and second antenna transformer elements 102 and 104 can also include an additional signal conductor that extends in the Z-direction to between the first and second antenna transformer elements 102 and 104 and additional antenna transformer elements that are adjacent in the +/−Z-direction. Therefore, while the wireless signal 152 is polarized in the X-direction based on the extension of the signal conductor 118 in the X-direction, the additional signal conductor that extends in the Z-direction can similarly provide polarization of the respective wireless signal in the Z-direction, similar to as described previously in the example of FIG. 2. In addition, as also previously described in the example of FIG. 2, while the first and second antenna transformer elements 102 and 104 are demonstrated as only including the first and second connectors 108 and 110, respectively, it is to be understood that the first and second antenna transformer elements 102 and 104 can each include a separate connector for the signal conductors that extend in the Z-direction. Alternatively, the connectors 108 and 110 can be associated with signal conductors that extend in the Z-direction, such that the signal conductors 118 and 154 can be conductively coupled with signal conductors that extend in the Z-direction.

Figure 5:
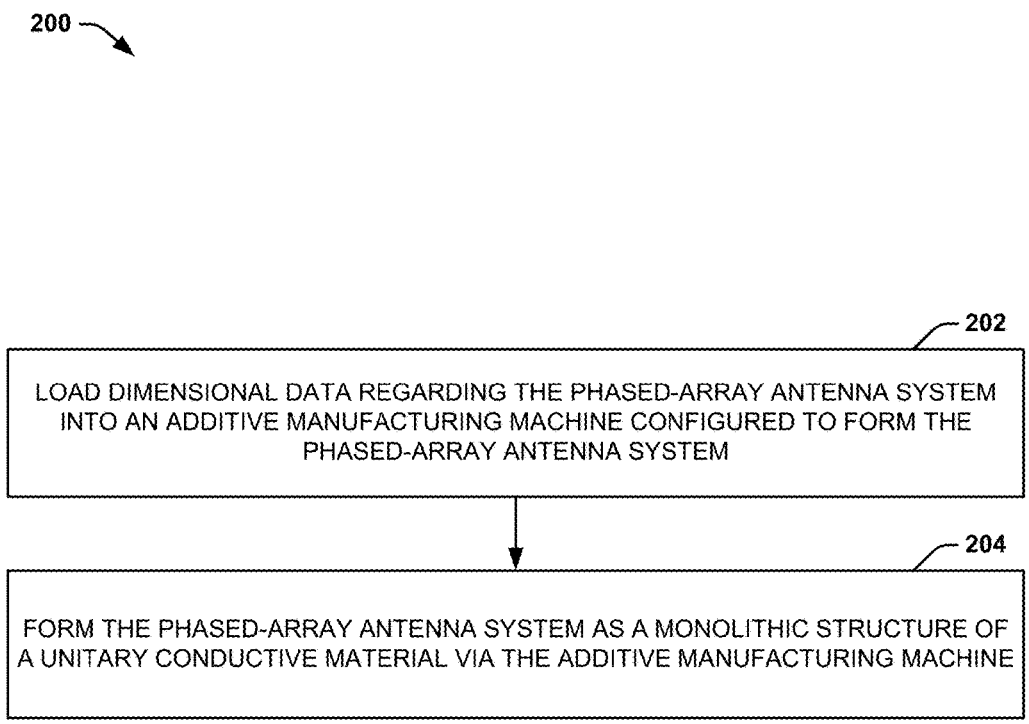
FIG. 5 illustrates an example of a method for forming a phased-array antenna system.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for forming a phased-array antenna system (e.g., the phased-array antenna system 10). At 202, a ground plane (e.g., the ground plane 12) is formed in an additive manufacturing process. At 204, a plurality of antenna transformer elements (e.g., the antenna transformer elements 14) are formed in an array on a first surface of the ground plane via the additive manufacturing process. At 206, a plurality of connectors (e.g., the connectors 56) are formed on a second surface of the ground plane opposite the first surface via the additive manufacturing process. Each of the plurality of connectors can include a signal conductor (e.g., a signal conductor 56) that is configured to propagate a signal (e.g., the signal $SIG_{\Phi 1}$). The additive manufacturing process can be such that the ground plane, the plurality of antenna transformer elements, and the plurality of connectors are formed as a single monolithic structure corresponding to the phased-array antenna system comprising a unitary conductive material to provide conductive connectivity between the ground plane, the plurality of antenna transformer elements, and the plurality of connectors.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A phased-array antenna system that is formed as a monolithic structure of a unitary conductive material, the system comprising:
   a ground plane;
   a plurality of antenna transformer elements formed in an array and conductively coupled to a first surface of the ground plane;
   a plurality of connectors formed and conductively coupled to a second surface of the ground plane opposite the first surface, the plurality of connectors being configured to propagate radio frequency signals to or from respective ones of the plurality of antenna transformer elements; and
   a signal conductor conductively coupled to an associated one of the plurality of antenna transformer elements and extending in free space from a sidewall of the associated one of the plurality of antenna transformer elements through a sidewall of an adjacent one of the plurality of antenna transformer elements,
   wherein the plurality of antenna transformer elements are dimensioned to form a balun cavity between respective pairs of the plurality of antenna transformer elements with respect to the ground plane.

2. The system of claim 1, wherein the plurality of antenna transformer elements are dimensioned to form a transformer gap between respective pairs of the plurality of antenna transformer elements to provide impedance matching to free-space.

3. The system of claim 1, wherein each of the plurality of antenna transformer elements comprises a plurality of sidewalls that each extend in respective directions away from the ground plane, with each of the plurality of sidewalls comprises a pattern of holes through the respective one of the plurality of sidewalls.

4. The system of claim 1, wherein the signal conductor is formed from the unitary conductive material and extends through the ground plane from the first surface to the second surface beneath the adjacent one of the plurality of antenna transformer elements.

5. The system of claim 1, wherein the signal conductor is a first signal conductor that extends in a first direction in free space between the associated one of the plurality of antenna transformer elements and a first adjacent one of the plurality of antenna transformer elements, wherein a second signal conductor extends in a second direction in free space between the associated one of the plurality of antenna transformer elements and a second adjacent one of the plurality of antenna transformer elements, the second direction being orthogonal with respect to the first direction to provide respective first and second orthogonal polarizations of the signal.

6. The system of claim 1, wherein the signal conductor is arranged as an inner conductor of a coaxial connection between the respective one of the plurality of connectors and the adjacent one of the plurality of antenna transformer elements, wherein the associated one of the plurality of antenna transformer elements is arranged as an outer conductor of the coaxial connection.

7. The system of claim 6, wherein the adjacent one of the plurality of antenna transformer elements comprises a conductive coupling to the ground plane that substantially surrounds the signal conductor as the signal conductor extends through the adjacent one of the plurality of antenna transformer elements, the conductive coupling corresponding to the outer conductor of the coaxial connection.

8. The system of claim 1, wherein the ground plane, the plurality of antenna transformer elements, and the plurality of connectors are formed from an additive manufacturing process to form the ground plane, the plurality of antenna transformer elements, and the plurality of connectors as the monolithic structure.

9. The system of claim 8, wherein the monolithic structure is formed from a dielectric material via the additive manufacturing process, wherein the unitary conductive material is formed over the dielectric material via a metallization process.

10. A phased-array antenna system comprising:
    a ground plane;
    a plurality of antenna transformer elements formed in an array and conductively coupled to a first surface of the ground plane, each of the plurality of antenna transformer elements being dimensioned to form a balun cavity between respective pairs of the plurality of antenna transformer elements with respect to the ground plane and to form a transformer gap between respective pairs of the plurality of antenna transformer elements to provide impedance matching to free-space;
    a plurality of connectors formed and conductively coupled to a second surface of the ground plane opposite the first surface, the plurality of connectors being configured to propagate radio frequency signals to or from respective ones of the plurality of antenna transformer elements; and
    a plurality of coaxial connections between the plurality of connectors and the plurality of transformer elements, each of the plurality of connectors being associated with one of the plurality of antenna transformer elements and comprising a signal conductor that is formed from the unitary conductive material as an inner conductor of a respective one of the plurality of coaxial connections and extending from a sidewall of an associated one of the plurality of antenna transformer elements through a sidewall of an adjacent one of the plurality of antenna transformer elements that is coupled to an outer conductor of the respective one of the plurality of coaxial connections,
    wherein the phased-array antenna system is formed as a monolithic structure of unitary conductive material.

11. The system of claim 10, wherein the signal conductor associated with the respective one of the plurality of coaxial connections extends in free space between the associated one of the plurality of antenna transformer elements and the adjacent one of the plurality of antenna transformer elements to provide excited interaction between the signal conductor and the associated one and the adjacent one of the plurality of antenna transformer elements to wirelessly transmit or receive the signal.

12. The system of claim 11, wherein the signal conductor is a first signal conductor that extends in a first direction in free space between the associated one of the plurality of antenna transformer elements and a first adjacent one of the plurality of antenna transformer elements, wherein a second signal conductor extends in a second direction in free space between the associated one of the plurality of antenna transformer elements and a second adjacent one of the plurality of antenna transformer elements, the second direction being orthogonal with respect to the first direction to provide respective first and second orthogonal polarizations of the signal.

\* \* \* \* \*